(12) United States Patent
Okubo et al.

(10) Patent No.: US 10,069,398 B2
(45) Date of Patent: Sep. 4, 2018

(54) NON-ISOLATED POWER SUPPLY DEVICE

(71) Applicant: MITSUMI ELECTRIC CO., LTD., Tokyo (JP)

(72) Inventors: Takashi Okubo, Kawasaki (JP); Yukio Murata, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/537,988

(22) PCT Filed: Dec. 18, 2015

(86) PCT No.: PCT/JP2015/085449
§ 371 (c)(1),
(2) Date: Jun. 20, 2017

(87) PCT Pub. No.: WO2016/104345
PCT Pub. Date: Jun. 30, 2016

(65) Prior Publication Data
US 2017/0353100 A1 Dec. 7, 2017

(30) Foreign Application Priority Data
Dec. 25, 2014 (JP) ................. 2014-261532

(51) Int. Cl.
*G05F 1/00* (2006.01)
*H05B 37/02* (2006.01)
(Continued)

(52) U.S. Cl.
CPC ........... *H02M 1/083* (2013.01); *H02M 3/156* (2013.01); *H05B 33/0815* (2013.01); *H02M 2001/0058* (2013.01)

(58) Field of Classification Search
CPC . G05F 1/561; H05B 41/36; H02M 2003/1557
(Continued)

(56) References Cited

U.S. PATENT DOCUMENTS 7,750,616 B2 * 7/2010 Liu ............... H05B 33/0815
323/224
8,106,597 B2 * 1/2012 Mednik .......... H05B 33/0815
315/185 S
(Continued)

FOREIGN PATENT DOCUMENTS

JP S58194462 A 11/1983
JP 2008193818 A 8/2008
(Continued)

OTHER PUBLICATIONS

International Preliminary Report on Patentability (IPRP) (and English translation thereof) dated Jun. 27, 2017 issued in counterpart International Application No. PCT/JP2015/085449.
(Continued)

*Primary Examiner* — Gary Nash
(74) *Attorney, Agent, or Firm* — Holtz, Holtz & Volek PC

(57) ABSTRACT

A control circuit that controls a switching element includes a first terminal to which a voltage produced by conversion of current flowing through the switching element by a current-to-voltage conversion element is input, a second terminal to which the voltage of a point of contact of an inductor and rectification element or a voltage proportional thereto is input, a filter for smoothing the voltage input into the second terminal, and a voltage comparison circuit for comparing the voltage smoothed by the filter and the voltage input into the second terminal. The control circuit performs control such that the switching element is switched from off to on near the point where the inductor current becomes zero based on the voltage comparison circuit output and the switching element is switched from on to off in response to the voltage applied to the first terminal reaching a prescribed voltage.

5 Claims, 7 Drawing Sheets

(51) Int. Cl.
  *H05B 39/04* (2006.01)
  *H05B 41/36* (2006.01)
  *H02M 1/08* (2006.01)
  *H02M 3/156* (2006.01)
  *H05B 33/08* (2006.01)
  *H02M 1/00* (2006.01)

(58) Field of Classification Search
  USPC ........ 315/119, 291; 323/235, 241, 246, 274, 323/275, 283–286; 363/78, 124
  See application file for complete search history.

(56) References Cited

U.S. PATENT DOCUMENTS

| | | | | |
|---|---|---|---|---|
| 8,324,832 B2 * | 12/2012 | Yan | .................... | H05B 33/0815 |
| | | | | 315/224 |
| 8,427,069 B2 * | 4/2013 | Wibben | ............. | H05B 33/0887 |
| | | | | 315/156 |
| 8,587,278 B2 * | 11/2013 | Mednik | ............. | H05B 33/0818 |
| | | | | 323/282 |
| 2007/0024259 A1 * | 2/2007 | Ball | ...................... | H02M 3/156 |
| | | | | 323/283 |
| 2010/0033150 A1 * | 2/2010 | Irissou | .................. | H02M 3/158 |
| | | | | 323/284 |
| 2010/0308733 A1 * | 12/2010 | Shao | .................... | H02M 1/4225 |
| | | | | 315/119 |
| 2011/0199023 A1 | 8/2011 | Zimmermann et al. | | |
| 2012/0249001 A1 | 10/2012 | Okubo et al. | | |
| 2012/0286667 A1 * | 11/2012 | Wang | .................. | H05B 33/0887 |
| | | | | 315/119 |
| 2013/0207563 A1 | 8/2013 | Hamamoto et al. | | |
| 2014/0085947 A1 | 3/2014 | Capilla et al. | | |

FOREIGN PATENT DOCUMENTS

| | | |
|---|---|---|
| JP | 2012115074 A | 6/2012 |
| JP | 2012212548 A | 11/2012 |
| JP | 2013165598 A | 8/2013 |
| JP | 2014229561 A | 12/2014 |

OTHER PUBLICATIONS

International Search Report (ISR) dated Mar. 15, 2016 issued in International Application No. PCT/JP2015/085449.
Extended European Search Report (EESR) dated Jun. 21, 2018 issued in counterpart European Application No. 15872914.5.

* cited by examiner

NON-ISOLATED POWER SUPPLY DEVICE

CROSS-REFERENCE TO RELATED APPLICATION

This application is a U.S. National Stage application of International Application No. PCT/JP2015/085449, filed Dec. 18, 2015, which claims priority of Japanese Application No. 2014-261532, filed Dec. 25, 2014, the entire contents of all of which are incorporated by reference herein.

TECHNICAL FIELD

The present invention relates to a non-insulated power supply device, in particular to a technique that is effectively applicable to switching control circuits of lighting power supply devices for supplying electric power to a lighting device using an LED (light emitting diode).

BACKGROUND ART

Conventional power supply devices for lighting equipment using an LED (hereinafter referred to as LED lamps) include insulated power supplies using a transformer and non-insulated power supplies using no transformer. Among them, an invention related to an insulated lighting power supply device is disclosed in Patent Document 1, and an invention related to a non-insulated lighting power supply device is disclosed in Patent Document 2, both of which are power supply devices based on switching control.

The control of the lighting power supply device disclosed in Patent Document 2 is such that it supplies a predetermined output current based on the voltage divided from an input voltage by means of a series resistor and the voltage generated by current-to-voltage conversion of a sense resistor connected in series with a switching transistor. Further, dimming control is achieved by using a phase-controlling dimmer.

PRIOR ART DOCUMENT

Patent Documents

Patent Document 1: JP 2012-115074A
Patent Document 2: JP 2012-212548A
Patent Document 3: JP 2008-193818A

SUMMARY OF INVENTION

Problem to be Solved by Invention

A problem with the lighting power supply device disclosed in Patent Document 2 is that the output current control depends on the input voltage that is likely to fluctuate.

In order to achieve an output current control that does not depend on the input voltage, the present inventor has considered a controlling method as described in FIG. 8 that involves detecting the timing at which the current through an inductor L0 connected in series with LEDs becomes zero as well as the voltage that is generated from the current flowing through a switching transistor Q1 by current-to-voltage conversion with a sense resistor Rs, and switching a switching transistor Q1 from OFF to ON at the detected timing.

The detection method as illustrated in FIG. 8 (A) is to detect the timing at which the current becomes zero by using a transformer TR instead of an inductor to perform current-to-voltage conversion of the current at the secondary coil thereof. The detection method as illustrated in FIG. 8 (B) is to detect the timing at which the current becomes zero by comparing the voltage between the terminals of an inductor L0.

However, a problem with the method as illustrated in FIG. 8 (A) is the increased number of parts due to the transformer TR, which results in the increased footprint and the increased cost. On the other hand, it has been found that a problem with the method as illustrated in FIG. 8 (B) is that when the control circuit (the portion enclosed by the dashed line C) is formed into a semiconductor integrated circuit, it requires a package with many pins since two external terminals (pins) P1, P2 are required for an input of the voltage between the terminals of the inductor, which results in the increased cost. In FIG. 8 (B), P2 is a zero current detection terminal ($V_{ZCD}$), and P1 is a reference terminal for the zero current detection.

As for the method that uses a transformer to detect the timing at which the current becomes zero, for example, an invention is disclosed in Patent Document 3. However, this invention is related to a power factor improving circuit that is suitable as a preceding stage of a non-insulated power supply device (switching power supply) or the like used as a lighting power supply device or the like for reducing a high frequency current generated in the power supply, and is not related to a non-insulated power supply device itself.

The present invention has been made in view of the above-described problem, and an object thereof is to provide a non-insulated power supply device that can turn on its switching element at an optimal timing by detecting the timing at which the current through an inductor becomes zero and that can thereby improve the power efficiency without an increase in the number of parts or the number of external terminals.

Means for Solving Problems

In order to realize the above object, according to the present invention, there is provided a non-insulated power supply device, including:
a switching element connected in series with a load;
an inductor connected in series with or in parallel to the load;
a rectification element connected such that a discharge current from the inductor can flow to the load while the switching element is off;
a current-voltage conversion element connected in series with the switching element; and
a control circuit which controls the switching element by on/off control,
wherein the non-insulated power supply device is configured to turn on the switching element so as to allow current to flow to the inductor, and thereafter to turn off the switching element so as to allow the discharge current from the inductor to flow to the rectification element and the load,
wherein the control circuit includes:
a first external terminal to which a voltage converted by the current-voltage conversion element is input;
a second external terminal to which a voltage at one terminal of the inductor or a voltage proportional to the voltage at the one terminal of the inductor is input;
a smoothing circuit which smooths the input voltage to the second external terminal; and
a voltage comparison circuit which compares a voltage smoothed by the smoothing circuit with the input voltage to the second external terminal, and wherein based on an output from the voltage comparison circuit, the control circuit switches the switching element from off to on at or near a timing at which a current through the inductor is reduced to zero, and switches the switching element from on to off in response to an input voltage to the first external terminal reaching a predetermined voltage.

With the above-described means, the output voltage of the smoothing circuit becomes proportional to the voltage at the terminal of the inductor which is not input to the control circuit. Accordingly, it is possible to detect the timing at which the discharge current of the inductor becomes zero only by adding a single external terminal to the control circuit, to which the voltage at the terminal of the inductor or the voltage proportional thereto is input. This enables turning on the switching element at an optimal timing, and the power efficiency is thus improved without an increase in the number of parts or the number of external terminals. Further, this enables correct detection of the timing at which the current through the inductor becomes zero even when the input voltage is fluctuating, and the switching control can therefor follow the fluctuation of the input voltage.

Preferably, the control circuit further comprises a buffer which is disposed between the second external terminal and the smoothing circuit and to which the voltage at the second external terminal is input, and the smoothing circuit smooths an output voltage from the buffer.

With the buffer to which the voltage at the zero current detection terminal as the second external terminal is input, the influence of the smoothing circuit connected to the output of the buffer on the potential at the connection node between the inductor and the rectification element can be eliminated. This enables avoiding a degradation of the original properties of the power supply device that is caused by an addition of a new component.

Preferably, the non-insulated power supply device further includes a dividing means which is disposed between the one terminal of the inductor and the second external terminal and which divides the voltage at the one terminal.

This enables avoiding a damage on the internal elements that is caused by application of a voltage to the control circuit over the withstanding voltage.

Preferably, the non-insulated power supply device further includes a capacitor element connected to the second external terminal.

With this configuration, it is possible to moderate plunge of the voltage input to the zero current detection terminal as the second external terminal, which enables turning on the switching element according to the detection of the bottom of a resonance that occurs after the current becomes zero. As a result, it is possible to delay the timing of turning on the switching element, and the switching noise can therefore be reduced, and the power efficiency can also be further improved.

Advantageous Effects of Invention

As described above, the present invention is advantageous in that the non-insulated power supply device can be obtained which turns on its switching element at an optimal timing by detecting the timing at which the current through the inductor becomes zero and which can thereby improve the power efficiency without an increase in the number of parts or the number of external terminals.

EMBODIMENTS FOR CARRYING OUT INVENTION

Hereinafter, a suitable embodiment of the present invention will be described based on the drawings.

Figure 1:
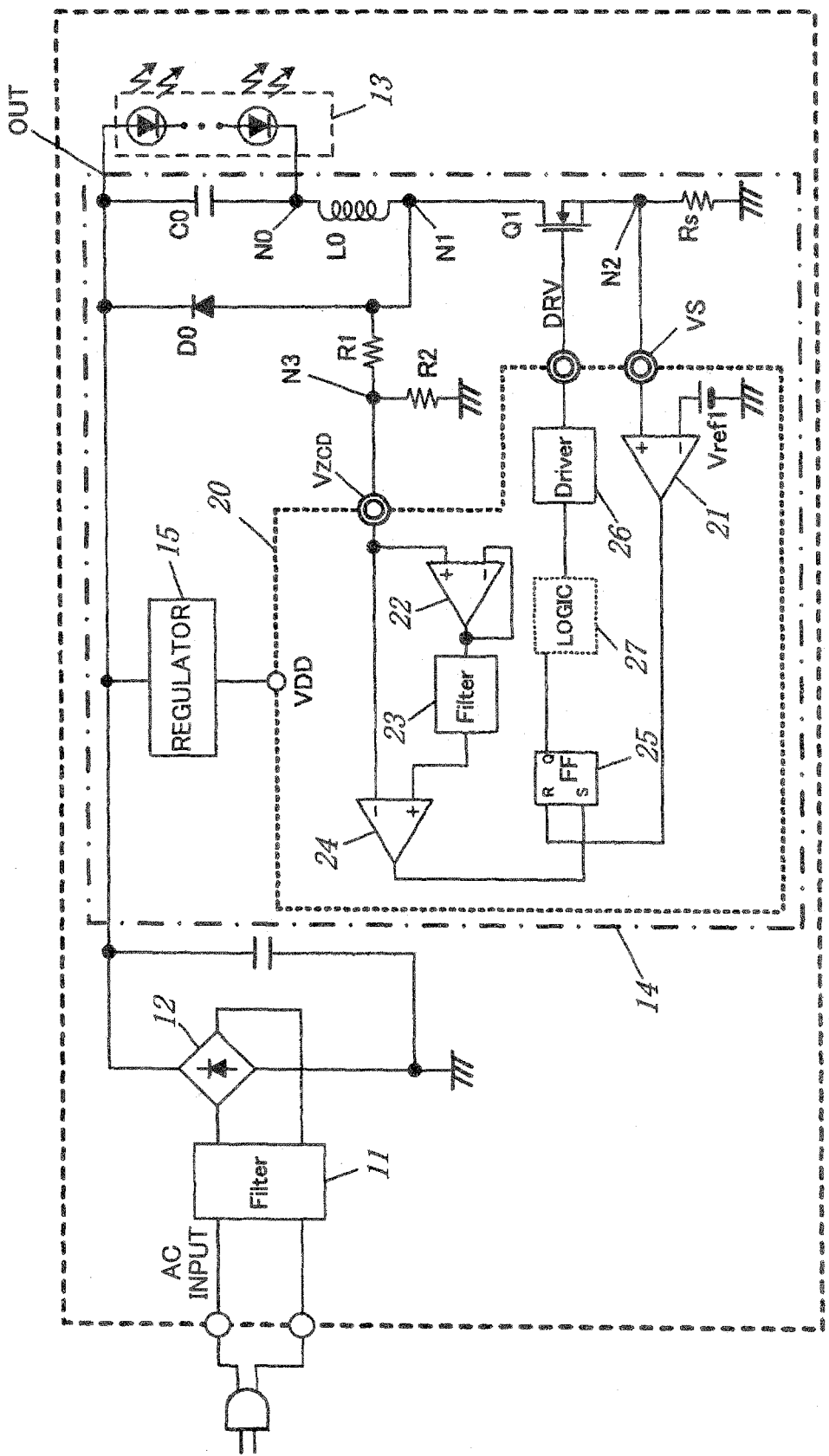
FIG. 1 is a block diagram of the schematic configuration of a lighting power supply device to which the present invention is effectively applied and an LED lighting system using the lighting power supply device.

FIG. 1 illustrates the schematic configuration of an LED power supply device to which the present invention is effectively applied, and an LED lighting system using the LED power supply device.

As illustrated in FIG. 1, the LED lighting system of the embodiment, to which an alternating power supply voltage AC is input from a commercial alternating power supply, includes: a noise cutoff filter 11 composed of a common mode coil and the like; a rectifier circuit 12 which is composed of a diode bridge, which converts the input alternating current to a direct current by full-wave rectification, and the like; an LED power supply circuit 14 which is composed of an DC-DC converter (direct voltage converter circuit) which supplies a desired electric power to an LED lamp 13, which is a load, based on the voltage and current converted by the rectifier circuit 12; and the like. The LED lamp 13 includes an LED array in which LEDs are connected in series.

The LED power supply circuit 14 of the embodiment includes: an inductor L0, a switching transistor Q1 and a sense resistor Rs for current detection that are connected in series with the LED lamp 13 between an output terminal OUT connected to the LED lamp 13 and a ground point; a rectifier diode D0 connected between a connection node N1 between the inductor L0 and the switching transistor Q1, and the output terminal OUT; a capacitor C0 connected in parallel to the LED lamp 13; a switching control semiconductor integrated circuit (hereinafter referred to as an control IC) 20 that controls the switching transistor Q1 by on/off control; and a regulator 15 that generates a power supply voltage required for the operation of the control IC 20. The LED power supply circuit 14 is thus configured as a so-called switching regulator.

When the switching transistor Q1 is turned on, electric current flows from the rectifier circuit 12 to the transistor Q1 through the LED lamp 13 and the inductor L0 so that the LED lamp 13 emits light and the inductor L0 accumulates an energy. Then, when the switching transistor Q1 is turned off, the energy accumulated in the inductor L0 is released so that electric current flows from the inductor L0 to the output terminal OUT through the rectifier diode D0. By this current, the LED lamp 13 emits light.

In the LED power supply circuit 14 of the embodiment, the potential at a connection node N2, which is generated by current-to-voltage conversion of the sense resistor Rs, is input to a current detection terminal VS of the control IC 20. Further, resistors R1, R2 are connected in series between the connection node N1 between the inductor L0 and the rectifier diode D0 and a ground point. The potential at a connection node N3 between the resistors R1 and R2 is input to a zero current detection terminal $V_{ZCD}$ of the control IC 20. The resistors R1, R2 are provided to divide voltage so that the voltage applied to the control IC 20 does not exceed the withstanding voltage, which can be omitted depending on the withstanding voltage of the control IC 20 or the system configuration.

The control IC 20 of the embodiment includes: a comparator 21 that compares the input voltage at the current detection terminal VS with a reference voltage $V_{ref1}$ so as to output a corresponding voltage; a voltage follower 22 which functions as a buffer, to which the voltage at the zero current detection terminal $V_{ZCD}$ is input; a smoothing filter 23 connected to an output terminal of the voltage follower 22; and a comparator 24 that compares the voltage at the zero current detection terminal $V_{ZCD}$ and the voltage smoothed by the smoothing filter 23 so as to output a corresponding voltage. The voltage follower 22 is provided in order to eliminate the influence of the smoothing filter 23 on the potential at the connection node N3.

The control IC 20 further includes: an RS flip-flop 25 with a reset terminal and a set terminal to which the output voltage of the comparator 21 and the output voltage of the comparator 24 are respectively input; and a driver circuit 26 that generates and outputs a drive signal DRV for the on/off control of the switching transistor Q1 according to the output of the RS flip-flop 25. When the current flowing through the inductor L0 becomes zero, the output voltage of the comparator 24 is changed to high so that the RS flip-flop 25 is set. Then, the output signal and thus the drive signal DRV output from the driver circuit 26 are changed to high so that the switching transistor Q1 is turned on.

Further, the control IC is configured to perform a control (peak current control) such that when the current $I_d$ flowing through the switching transistor Q1 reaches a predetermined level (which corresponds to $V_{ref1}$), the output voltage of the comparator 21 is changed to high and the RS flip-flop 25 is reset. Then, the drive signal DRV is changed to low so that the switching transistor Q1 is turned off.

Between the RS flip-flop 25 and the driver circuit 26, a logic circuit 27 may be provided which controls the operation of the drive circuit 26 by logical operation between the output of the RS flip-flop 25 and the signal for controlling the operation and protecting function of the control IC 20.

While any dimming control system is not illustrated in the control IC 20 in FIG. 1, dimming control can be achieved, for example, by a configuration such that a variable voltage supply is provided as a reference voltage supply ($V_{ref1}$) that is connected to the inverting input terminal of the comparator 21, and that the voltage of the variable voltage supply is changed according to an external dimming control signal.

Another possible configuration is such that a variable resistor (volume) is used as the sense resistor Rs, and that dimming control is achieved by changing the resistance thereof. The zero current detecting method of the present invention is applicable regardless of the dimming method including DC dimming, PWM dimming, phase dimming and the like.

Figure 2:
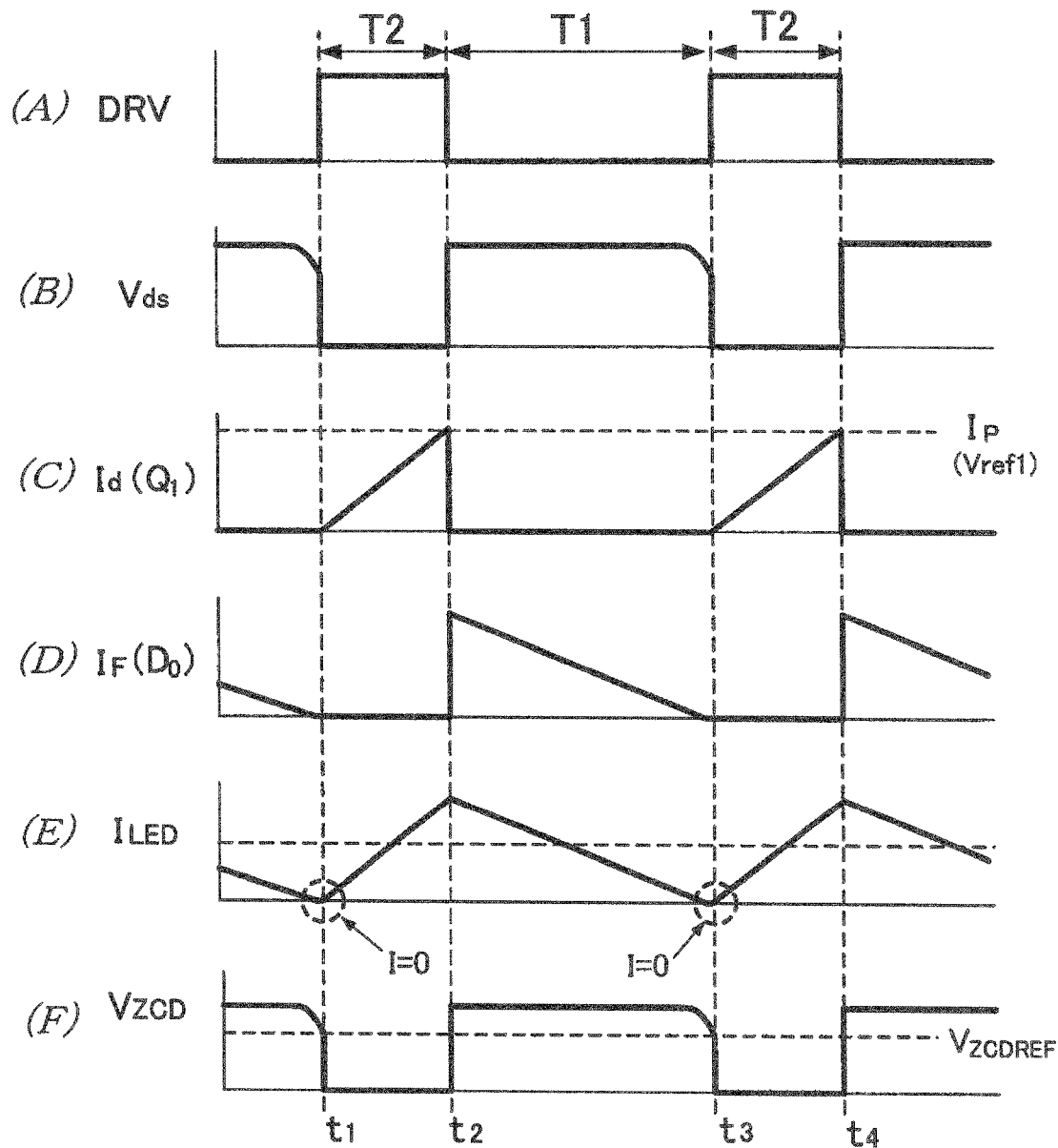
FIG. 2 is a timing chart illustrating the change of signal and voltage at different components of a control IC of the power supply device in the lighting system according to the embodiment.

Next, the on/off control operation of the switching transistor Q1 by the control IC 20 will be described referring to the timing chart of FIG. 2. In FIG. 2, (A) is the waveform of the drive signal DRV, which is output from the driver circuit 26 to control the switching transistor Q1 by on/off control, (B) is the waveform of a drain-source voltage $V_{ds}$ of the switching transistor Q1, (C) is the waveform of the drain current $I_d$ of the switching transistor Q1, (D) is the waveform of the current $I_F$ through the rectifier diode D0, (E) is the waveform of the current $I_{LED}$ ($=I_d+I_F$) flowing through the LED lamp 13, and (F) is the waveform of the voltage at the zero current detection terminal $V_{ZCD}$.

As illustrated in FIG. 2, the control IC 20 according to the embodiment operates such that the drain current $I_d$ of the switching transistor Q1 as illustrated in FIG. 2 (C) is zero during a period T1 in which the on/off drive signal DRV for the switching transistor Q1 is low so that the transistor Q1 is off, but it starts to increase gradually from a timing t1 when the drive signal DRV is changed to high so that the transistor Q1 is turned on (period T2). When the drain current $I_d$ reaches a predetermined value $I_p$, the transistor Q1 is turned off (timing t2). Then, as illustrated in FIG. 2 (D), the current $I_F$ through the rectifier diode D0 rises sharply and thereafter gradually decreases (period T1). At a timing t3 at which the current $I_F$ becomes zero, a resonance would occur if the transistor Q1 was not turned on. In contrast, the control IC 20 of the embodiment, which can detect the timing t3 at which the current $I_F$ becomes zero by means of the comparator 24, sets the RS flip-flop 25 at the detected timing so as to turn on the transistor Q1.

Accordingly, during the period T2 in which the switching transistor Q1 is on, the drain current $I_d$ of the switching transistor Q1 gradually increases as illustrated in FIG. 2 (D) while the current $I_F$ through the rectifier diode D0 remains zero as illustrated in FIG. 2 (D). This current is converted by current-voltage conversion of the sense resistor Rs, and is input to the current detection terminal VS and compared with the reference voltage $V_{ref1}$ by the comparator 21. When the voltage at the terminal VS reaches the reference voltage $V_{ref1}$, the output of the comparator 21 is changed so that the RS flip-flop 25 is reset. Accordingly, the transistor Q1 is turned off. By repeating the above-described operation, electric current keeps flowing through the LED lamp 13, which is a load, and the light emission is thus maintained.

Furthermore, the control IC 20 of the embodiment includes the smoothing filter 23 that is disposed at the zero current detection terminal $V_{ZCD}$ to smooth the input voltage of the terminal, and is configured to determine the timing of turning on the switching transistor Q1 by comparing the smoothed voltage $V_{ZCDREF}$ with the input voltage at the zero current detection terminal $V_{ZCD}$ by means of the comparator 24.

In this process, the voltage (hereinafter referred to as the one-side voltage) at the terminal NO opposite the connection node N1 of the inductor L0 is represented by the following equation.

$$V_{IND} = V_{IN} - V_{LED} \tag{1}$$

$V_{IND}$ is the one-side voltage, $V_{IN}$ is the input voltage, and $V_{LED}$ is the voltage applied to the LED lamp 13.

The voltage $V_{LED}$ applied to the LED lamp 13 is represented by the following equation.

$$V_{LED} = \frac{T_{ON}}{T_{ON} + T_{OFF}} \times V_{IN} \qquad (2)$$

$T_{on}$ is the period in which the switching transistor Q1 is on, and $T_{off}$ is the period in which the switching transistor Q1 is off. Substituting the equation (2) in the equation (1) yields the following equation.

$$V_{IND} = V_{IN} - \frac{T_{ON}}{T_{ON} + T_{OFF}} \times V_{IN} \qquad (3)$$
$$= \frac{T_{OFF}}{T_{ON} + T_{OFF}} \times V_{IN}$$

It can be understood from the above equation (3) that the one-side voltage $V_{IND}$ of the inductor L0 is the product of the input voltage $V_{IN}$ and the off duty. In contrast, it can be understood from the waveform in FIG. 2 (F) that the average voltage $V_{ZCDREF}$ at the zero current detection terminal $V_{ZCD}$ is obtained by flattening the voltage at the zero current detection terminal $V_{ZCD}$ during the off period T1. That is, the smoothing filter 23 of the control IC 20 of the embodiment is equivalent to a pseudo-generator that generates a voltage proportional to the voltage at the terminal of the inductor L0 that is not input to the control IC 20.

From the above description, it can be understood that the configuration of the embodiment enables detection of the timing (t1, t3, . . . ) at which the current through the inductor L0 becomes zero only by adding the single zero current detection terminal $V_{ZCD}$ to the control IC 20. Further, this configuration is advantageous in that the switching control can follow the fluctuation of the input voltage since the timing at which the current through the inductor L0 becomes zero can be detected correctly even when the input voltage Vin is fluctuating. Furthermore, even when the number of LEDs of the LED lamp 13 is changed, it is not necessary to change the configuration of the circuit.

Figure 3:
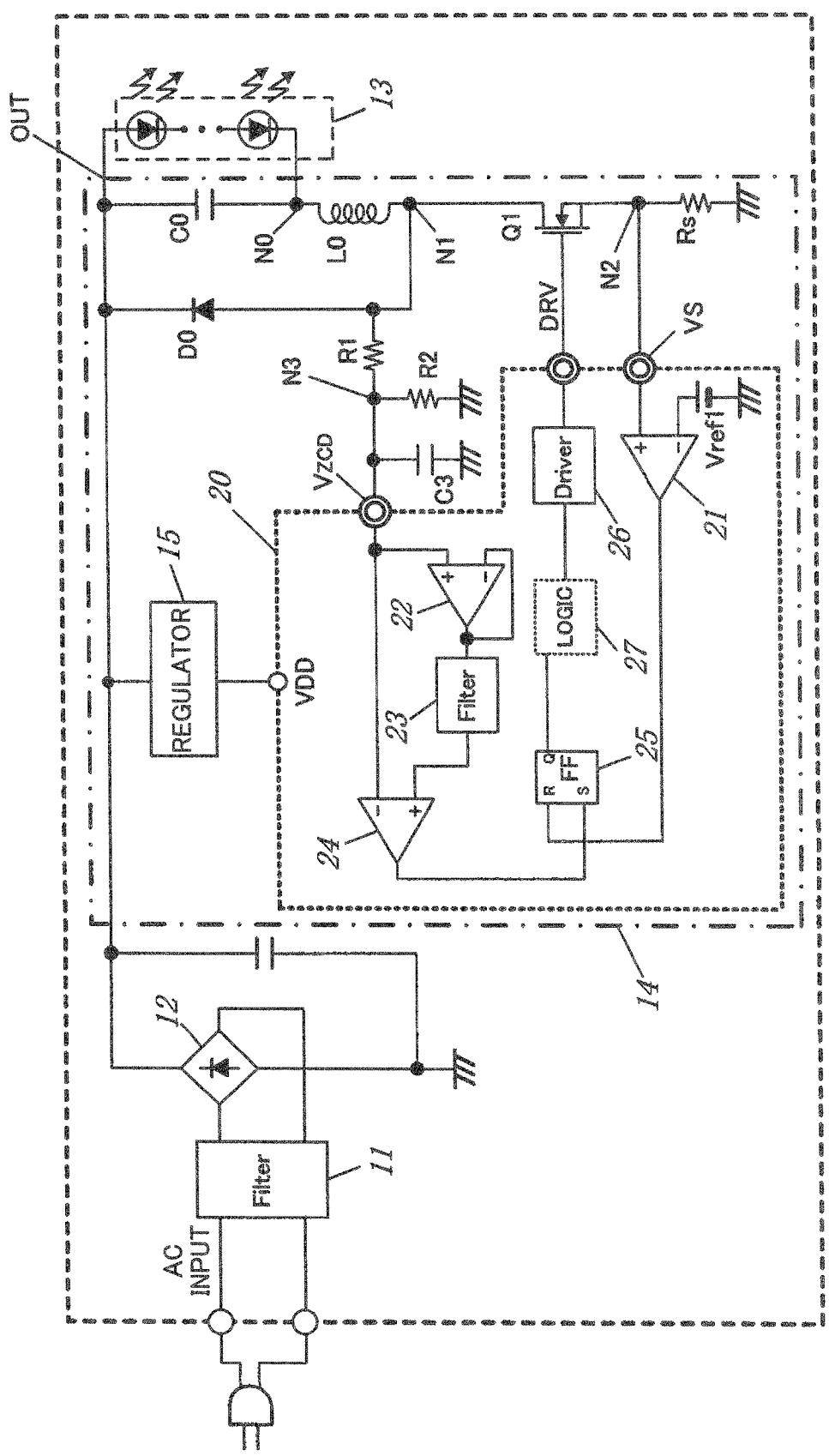
FIG. 3 is a circuit configuration view of a first variation of the LED power supply device according to the embodiment.

FIG. 3 illustrates a first variation of the LED power supply circuit 14 in FIG. 1.

Figure 4:
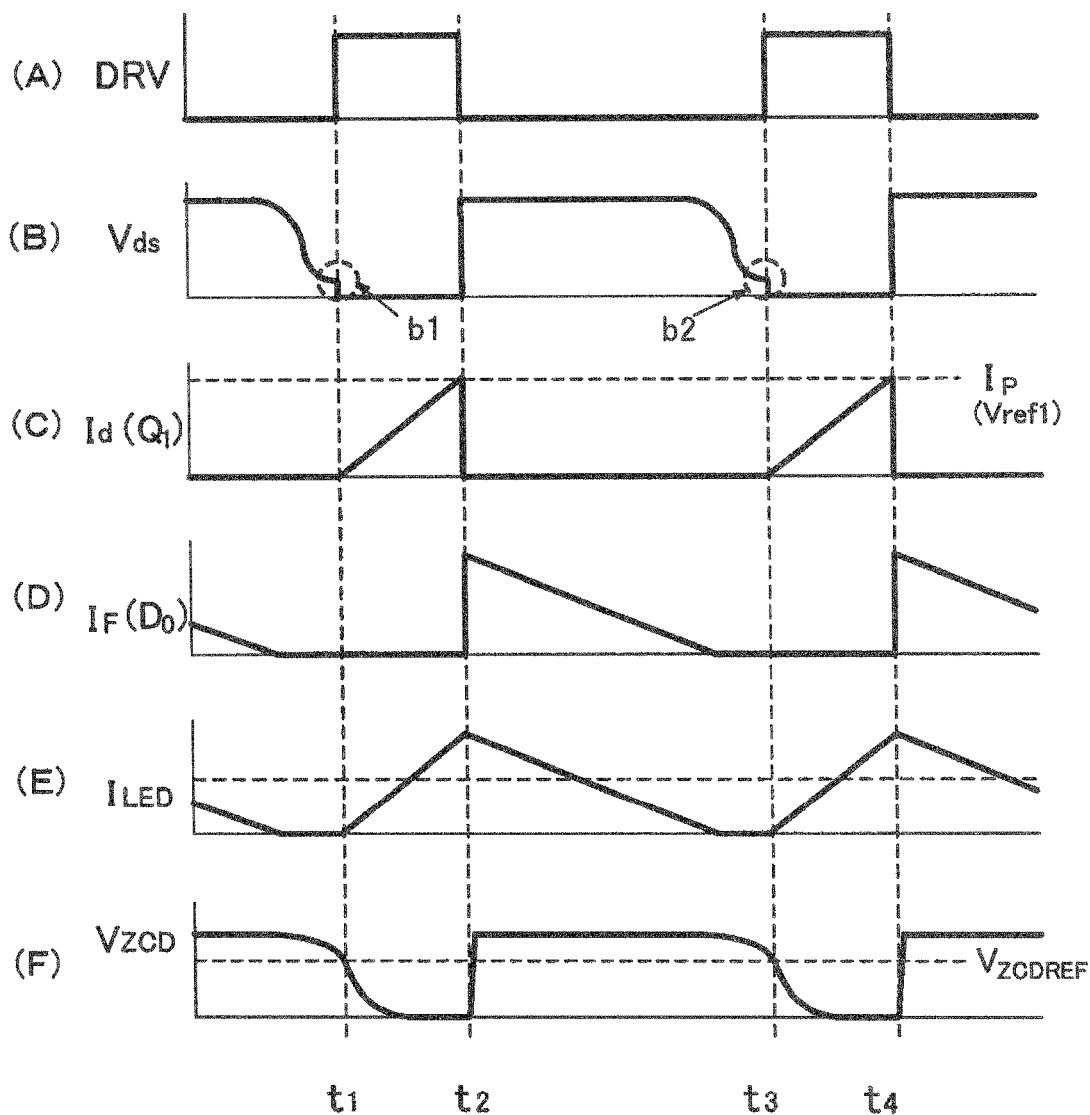
FIG. 4 is a timing chart illustrating the change of signal and voltage at different components of a control IC of the power supply device of the variation.

The LED power supply circuit 14 of the variation includes an external capacitor C3 connected to the zero current detection terminal $V_{ZCD}$ of the control IC 20 as illustrated in FIG. 1 so that the plunge of the voltage input to the terminal $V_{ZCD}$ is moderated. In this way, the LED power supply circuit 14 is configured to turn on the switching transistor Q1 in response to detection of the bottoms b1, b2, . . . (timing t1, t3, . . . ) of resonances that are generated after the current reaches zero as illustrated in FIG. 4 instead of the timing at which the current through the inductor L0 becomes zero.

This variation is advantageous in the reduced switching noise and the improved power efficiency compared to the LED power supply circuit in FIG. 1 since the timing of turning on the switching transistor Q1 can be delayed.

Figure 5:
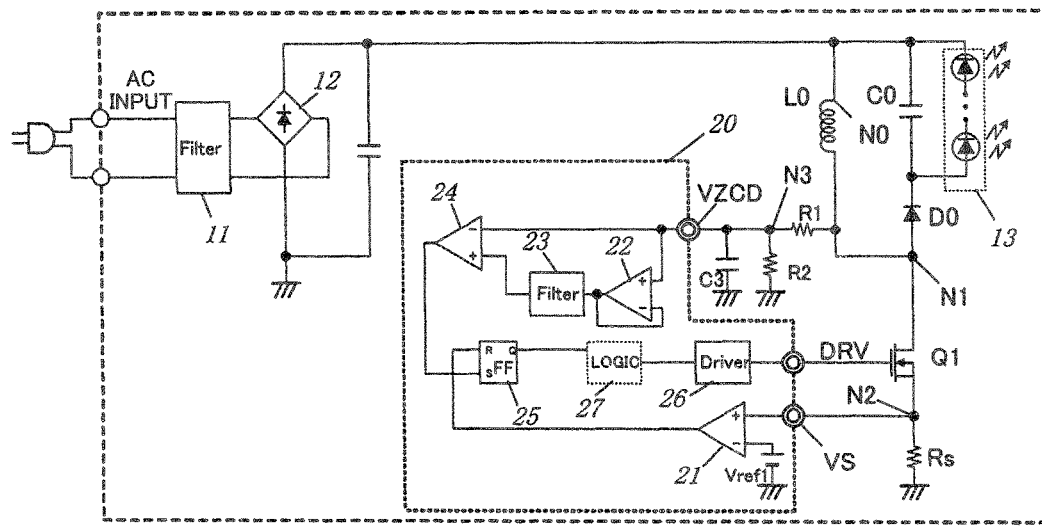
FIG. 5 is a circuit configuration view of a second variation of the LED power supply device according to the embodiment.
Figure 6:
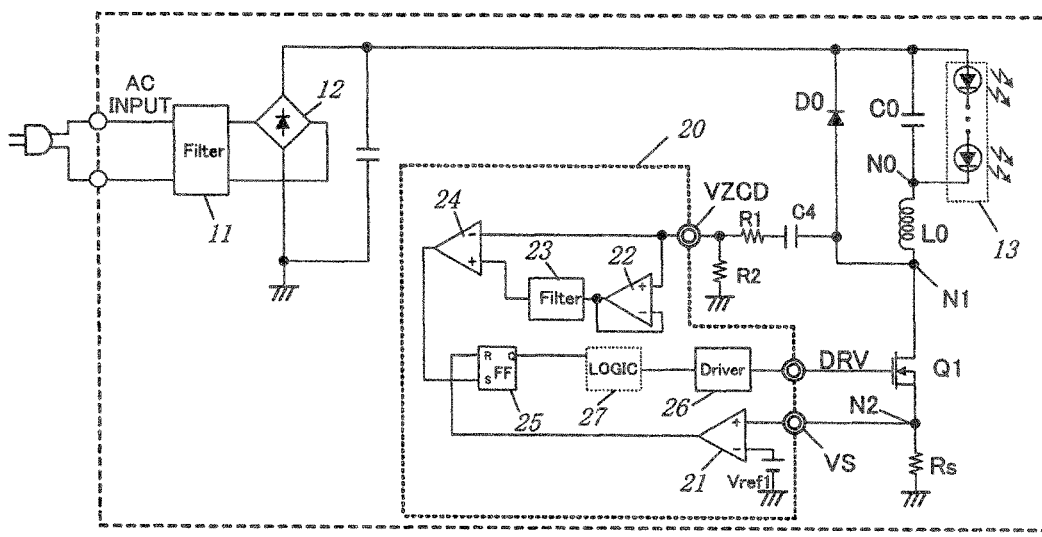
FIG. 6 is a circuit configuration view of a third variation of the LED power supply device according to the embodiment.
Figure 7:
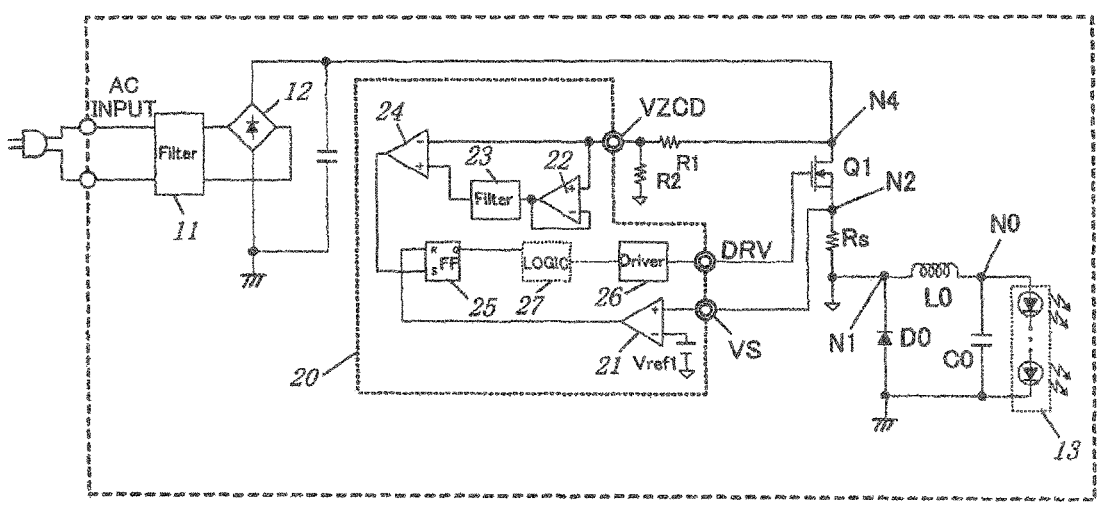
FIG. 7 is a circuit configuration view of a fourth variation of the LED power supply device according to the embodiment.
Figure 8A:
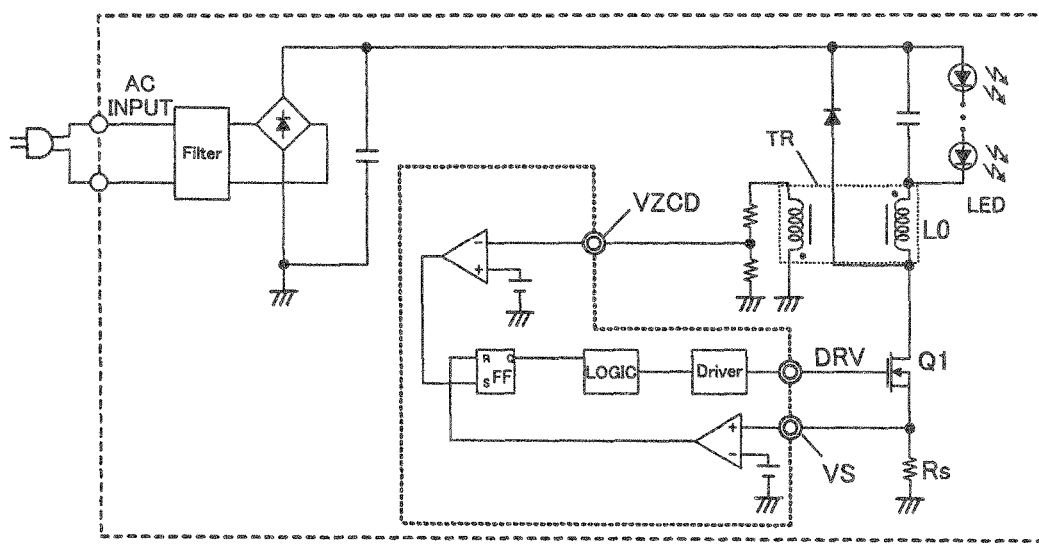
FIG. 8A is a circuit configuration view of an exemplary configuration of a lighting power supply device that was considered before the present invention was made.
Figure 8B:
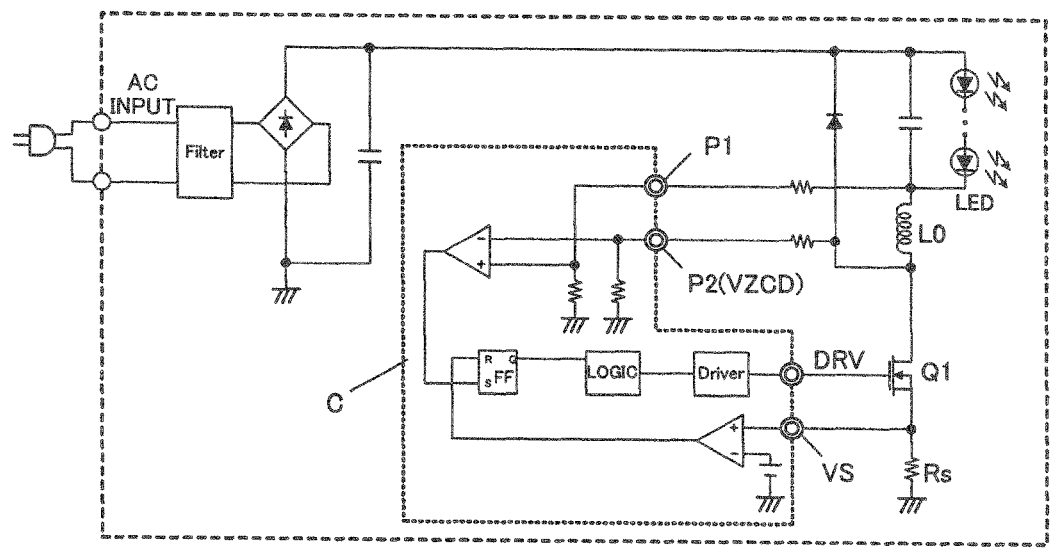
FIG. 8B is a circuit configuration view of an exemplary configuration of a lighting power supply device that was considered before the present invention was made.

FIG. 5 to FIG. 7 illustrate second to fourth variations of the LED power supply circuit 14 in FIG. 1.

The LED power supply circuit 14 of the second variation as illustrated in FIG. 5 is configured as a step-up power supply device in which the rectifier diode D0 is disposed in series with the LED lamp 13, and the inductor L0 is disposed in parallel to them. The power supply circuit as illustrated in FIG. 5 includes an external capacitor C3 connected to the zero current detection terminal $V_{ZCD}$ of the control IC 20 and is configured to detect the bottoms of resonances. However, a configuration without the capacitor C3 is also possible as in the LED power supply circuit in FIG. 1.

The LED power supply circuit 14 of the third variation as illustrated in FIG. 6 includes a coupling capacitor C4 connected in series with the resistor R1 between the connection node N1 between the inductor L0 and the switching transistor Q1 and the zero current detection terminal $V_{ZCD}$ of the control IC 20, and is configured to detect the timing at which the current becomes zero by transmitting the potential change at the connection node N1 to the zero current detection terminal $V_{ZCD}$ by means of AC coupling.

The LED power supply circuit 14 of the fourth variation in FIG. 7 is configured as a high-side driver power supply device (not sink-type but source-type power supply device) in which the rectifier diode D0 is connected in the opposite direction in series with the switching transistor Q1 and the sense resistor Rs, the inductor L0 and the LED lamp 13 are connected in series between the connection node N1 between the sense resistor R2 and the rectifier diode D0 and a ground point, and the capacitor CO is disposed in parallel to the LED lamp 13.

While the invention made by the present inventor is specifically described based on an embodiment, the present invention is not limited to the above-described embodiment. For example, the embodiment is an example of a DC-DC converter that includes the switching transistor Q1, the rectifier diode D0 and the inductor L0. However, a configuration as a so-called synchronous rectifier switching regulator is also possible in which a transistor is used instead of the rectifier diode D0, and a control IC 20 monitors the drain-source voltage of the transistor so as to perform the on/off control complementarily with the switching transistor Q1.

INDUSTRIAL APPLICABILITY

The present invention is applicable not only to LED lighting power supply devices but also to lighting power supply devices for lighting equipment other than LED lamps and other general non-insulated power supply devices.

REFERENCE SIGNS LIST

11 Filter
12 Rectifier circuit
13 LED lamp (lighting equipment)
14 LED power supply circuit (lighting power supply device)
15 Regulator
20 Control IC (control circuit)
21, 24 Comparator
22 Voltage follower
23 Smoothing filter (smoothing circuit)
25 RS flip-flop
26 Driver circuit
27 Logic circuit

The invention claimed is:
1. A non-insulated power supply device, comprising:
a switching element connected in series with a load;
an inductor connected in series with or in parallel to the load;
a rectification element connected such that a discharge current from the inductor can flow to the load while the switching element is off;

a current-voltage conversion element connected in series with the switching element; and a control circuit which controls the switching element by on/off control, wherein the non-insulated power supply device is configured to turn on the switching element so as to allow current to flow to the inductor, and thereafter to turn off the switching element so as to allow the discharge current from the inductor to flow to the rectification element and the load, wherein the control circuit comprises:

a first external terminal to which a voltage converted by the current-voltage conversion element is input;

a second external terminal to which a voltage at one terminal of the inductor or a voltage proportional to the voltage at the one terminal of the inductor is input;

a smoothing circuit which smooths the input voltage to the second external terminal; and a voltage comparison circuit which compares a voltage smoothed by the smoothing circuit with the input voltage to the second external terminal, and wherein based on an output from the voltage comparison circuit, the control circuit switches the switching element from off to on at or near a timing at which a current through the inductor is reduced to zero, and switches the switching element from on to off in response to an input voltage to the first external terminal reaching a predetermined voltage.

2. The non-insulated power supply device according to claim 1, wherein the control circuit further comprises a buffer which is disposed between the second external terminal and the smoothing circuit and to which the voltage at the second external terminal is input, and wherein the smoothing circuit smooths an output voltage from the buffer.

3. The non-insulated power supply device according to claim 2, further comprising a dividing means which is disposed between the one terminal of the inductor and the second external terminal and which divides the voltage at the one terminal.

4. The non-insulated power supply device according to claim 1, further comprising a dividing means which is disposed between the one terminal of the inductor and the second external terminal and which divides the voltage at the one terminal.

5. The non-insulated power supply device according to claim 4, further comprising a capacitor element connected to the second external terminal.

* * * * *